(12) United States Patent
Shionoya et al.

(10) Patent No.: US 9,714,708 B2
(45) Date of Patent: Jul. 25, 2017

(54) CYLINDRICAL GASKET, METHOD FOR MANUFACTURING THE SAME, AND INSERTION-TYPE EXHAUST PIPE JOINT USING THE CYLINDRICAL GASKET

(71) Applicant: OILES CORPORATION, Tokyo (JP)

(72) Inventors: Shin-ichi Shionoya, Fujisawa (JP); Koichi Ishida, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 547 days.

(21) Appl. No.: 14/358,463

(22) PCT Filed: Nov. 12, 2012

(86) PCT No.: PCT/JP2012/007254
§ 371 (c)(1),
(2) Date: May 15, 2014

(87) PCT Pub. No.: WO2013/073159
PCT Pub. Date: May 23, 2013

(65) Prior Publication Data
US 2014/0312618 A1    Oct. 23, 2014

(30) Foreign Application Priority Data

Nov. 17, 2011    (JP) .................................. 2011-251304

(51) Int. Cl.
*F01N 13/18*    (2010.01)
*F16J 15/08*    (2006.01)
(Continued)

(52) U.S. Cl.
CPC .......... *F16J 15/0806* (2013.01); *F01N 13/16* (2013.01); *F01N 13/1827* (2013.01);
(Continued)

(58) Field of Classification Search
CPC ....... F16L 21/06; F16J 15/126; F01N 13/1827
(Continued)

(56) References Cited

U.S. PATENT DOCUMENTS 4,423,544 A * 1/1984 Kashmerick ........... F16J 15/126
4,516,782 A * 5/1985 Usher ...................... F16J 15/12
(Continued)

FOREIGN PATENT DOCUMENTS

CN    1128558    8/1996
CN    101568753    10/2009
(Continued)

OTHER PUBLICATIONS

The State Intellectual Property Office of the People's Republic of China, "Notice on the First Office Action," (5 pages) issued in connection with Chinese Patent Application No. 201280056549.1, dated Jul. 27, 2015, with its English language Translation (6 pages).
(Continued)

*Primary Examiner* — David E Bochna
(74) *Attorney, Agent, or Firm* — Nixon & Vanderhye P.C.

(57) ABSTRACT

A cylindrical gasket includes a reinforcing member 70, a heat-resistant material 71, and pores which are dispersedly distributed in the reinforcing member 70 and the heat-resistant material 71, the reinforcing member 70 and the heat-resistant material 71 are intertwined with each other so as to be provided with structural integrity, and with respect to a total volume of the cylindrical gasket, the reinforcing member 70 occupies a volume of 32 to 60%, the heat-resistant material 71 occupies a volume of 5 to 58%, and the pores occupy a volume of 10 to 35%.

5 Claims, 5 Drawing Sheets

(51) Int. Cl.
*F16J 15/12* (2006.01)
*F16L 21/06* (2006.01)
*F01N 13/16* (2010.01)
*F16L 23/16* (2006.01)

(52) U.S. Cl.
CPC ......... *F16J 15/0812* (2013.01); *F16J 15/126* (2013.01); *F16L 21/065* (2013.01); *F16L 23/16* (2013.01); *Y10T 29/49398* (2015.01)

(58) Field of Classification Search
USPC .................................................. 285/374, 322
See application file for complete search history.

(56) References Cited

U.S. PATENT DOCUMENTS

| | | | | |
|---|---|---|---|---|
| 4,559,249 | A * | 12/1985 | Arigaya | F16J 15/126 |
| 4,902,024 | A * | 2/1990 | Takenoshita | F16J 15/126 |
| 5,065,493 | A * | 11/1991 | Ozora | F16J 15/126 |
| 5,451,064 | A * | 9/1995 | Mercuri | F16J 15/126 |
| 5,803,464 | A | 9/1998 | Ueda et al. | |
| 6,082,739 | A | 7/2000 | Ueda et al. | |
| 6,129,362 | A | 10/2000 | Kashima et al. | |
| 6,699,540 | B1 | 3/2004 | Tsukamoto | |
| 7,172,202 | B2 * | 2/2007 | Kubota | F16J 15/126 |
| 7,413,195 | B2 * | 8/2008 | Kubota | F16J 15/126 |
| 7,883,095 | B2 * | 2/2011 | Miyamoto | F16L 23/24 |
| 8,210,575 | B2 * | 7/2012 | Ignaczak | F16L 21/065 |
| 8,282,106 | B1 | 10/2012 | Ueda et al. | |
| 8,567,793 | B2 * | 10/2013 | Kubota | F16J 15/126 |
| 8,602,420 | B2 * | 12/2013 | Maeda | F16J 15/126 |
| 2002/0190483 | A1 | 12/2002 | Murakami et al. | |
| 2009/0302552 | A1 | 12/2009 | Leinfelder et al. | |
| 2010/0194058 | A1 | 8/2010 | Kircanski et al. | |
| 2010/0270754 | A1 | 10/2010 | Kubota et al. | |
| 2014/0312618 | A1 * | 10/2014 | Shionoya | F16J 15/126 |

FOREIGN PATENT DOCUMENTS

| | | | |
|---|---|---|---|
| CN | 101799071 | 8/2010 | |
| CN | 101903690 | 12/2010 | |
| EP | 2 216 569 | 8/2010 | |
| JP | 61-244815 | 10/1986 | |
| JP | 25859/1988 | 9/1989 | |
| JP | 47620/1993 | 6/1993 | |
| JP | 06-146875 | 5/1994 | |
| JP | 36273/1994 | 9/1994 | |
| JP | 10-231934 | 9/1998 | |
| JP | 2001-32936 | 2/2001 | |
| JP | 2002-267019 | 9/2002 | |
| JP | 2004-003604 | 1/2004 | |
| JP | 2004-3604 | 1/2004 | |
| JP | CA 2818651 A1 * | 6/2012 | F16J 15/126 |
| WO | WO 2009/078165 | 6/2009 | |

OTHER PUBLICATIONS

International Search Report for PCT/JP2012/007254, mailed Feb. 19, 2013.
Microfilm of the specification and drawings annexed to the request of Japanese Model Application No. 25859/1988 (Laid-open No. 130018/1989); Sep. 5, 1989.
Search Report in PCT/JP2012/007254 dated Feb. 19, 2013.

* cited by examiner

US 9,714,708 B2

CYLINDRICAL GASKET, METHOD FOR MANUFACTURING THE SAME, AND INSERTION-TYPE EXHAUST PIPE JOINT USING THE CYLINDRICAL GASKET

This application is the U.S. national phase of International Application No. PCT/JP2012/007254 filed 12 Nov. 2012 which designated the U.S. and claims priority to JP Patent Application No. 2011-251304 filed 17 Nov. 2011, the entire contents of each of which are hereby incorporated by reference.

TECHNICAL FIELD

The present invention relates to a cylindrical gasket which is suitably used for an insertion-type exhaust pipe joint used in a motor vehicle such as an ATV (all-terrain vehicle: a four-wheeled buggy), a snowmobile, and a two-wheeled vehicle, a method of manufacturing the same, and an insertion-type exhaust pipe joint using the cylindrical gasket.

BACKGROUND ART

An insertion-type exhaust pipe joint includes an inner pipe and an outer pipe having an inside diameter substantially identical to the outside diameter of this inner pipe, wherein the outer pipe has an enlarged-diameter portion at its pipe end portion, and the inner pipe has a pipe end portion which is passed through the enlarged-diameter portion of the outer pipe and is fitted at its one end portion to the pipe end portion of the outer pipe, and wherein a gasket is fitted in an annular gap between the pipe end portion of the inner pipe and the enlarged-diameter portion of the outer pipe so as to seal the gap between the inner and outer pipes by a tightening band disposed on the outer peripheral surface of the outer pipe (refer to Patent Document 1, Patent Document 2, and Patent Document 3).

Further, as a gasket which is used for the above-described exhaust pipe joint, a gasket has been proposed wherein a strip is formed by cutting an expanded graphite sheet into a fixed width and length, a metal wire net cut to a length substantially identical to the length of the expanded graphite sheet is superposed on this strip, this superposed assembly is convoluted around a cylindrical core with the metal wire net placed on the inner side to fabricate a hollow cylindrical member, and this hollow cylindrical member is inserted in a die and is subjected to compression forming in its axial direction, whereby the metal wire net or the expanded graphite is exposed on its inner peripheral surface and its opposite end faces and outer peripheral surface are covered by the expanded graphite (refer to Patent Document 1 and Patent Document 3).

In addition, there has also been proposed an annular gasket wherein a gasket main body is provided by enclosing overall surfaces of an expanded graphite sheet by a metallic net, and the gasket main body is curved into a an annular shape and is compressed by a press machine such that the expanded graphite and the net are integrally secured to each other (refer to Patent Document 4).

In the expanded graphite which is used in the gasket proposed in the above-described Patent Documents 1 to 3, its characteristics such as heat resistance, chemical resistance, and low-friction property are substantially equivalent to those of normal graphite; however, such expanded graphite can be easily formed into a thin sheet or a block by being subjected to pressurization without using a binder, and an object thus obtained has a characteristic of being pliable and flexible unlike the aforementioned graphite.

Accordingly, the gasket, which is formed of expanded graphite and a metal wire net and is disposed between the inner pipe and an enlarged-diameter portion of the outer pipe of the exhaust pipe joint, undergoes expansion in volume due to the heat of exhaust gases flowing through the inner pipe and has pliability and flexibility, so that the gasket is capable of adapting itself well and fits to the gap between the inner pipe and the outer pipe, thereby making it possible to improve the sealability between the inner pipe and the outer pipe (refer to Patent Document 1).

PRIOR ART DOCUMENTS

Patent Documents

Patent Document 1: JP-A-61-244815
Patent Document 2: JP-UM-B-6-36273
Patent Document 3: JP-A-6-146875
Patent Document 4: JP-UM-A-5-47620

SUMMARY OF THE INVENTION

Problems to be Solved by the Invention

In recent years, however, the exhaust pipe has become large in size as a countermeasure for noise, and a catalytic converter has come to be mounted on the exhaust pipe as an emission control measure, so that an excessively large load has come to be applied to the insertion-type exhaust pipe joint. Due to traveling on a rough road, in particular, the joint portion is repeatedly subjected to vibrational load and bending torque, and prying repeatedly occurs between the inner and outer pipes.

With respect to the vibrational load, bending torque, and prying which repeatedly occur, the gasket is required to have pliability needed to exhibit sealability as well as rigidity for receiving a tightening force without the occurrence of a permanent set at the time of tightening with a tightening band. With respect to these two conflicting performances, the above-described conventional gaskets are respectively specialized in either one of the performances of pliability and rigidity, and it is difficult to render both performances compatible. As a result, in the case of a gasket which is specialized in rigidity, a problem occurs in sealability, while, in the case of a gasket which is specialized in pliability, a problem can possibly occur in that sealability of the gap between the inner and outer pipes is caused to decline due to such as the loosening of the tightening band caused by such as the permanent set of the gasket.

The present invention has been devised in view of the above-described aspects, and its object is to provide a cylindrical gasket which is suitably used for an insertion-type exhaust pipe joint and which has both sealability and rigidity, as well as a method of manufacturing the same, and an insertion-type exhaust pipe joint using the cylindrical gasket.

Means for Overcoming the Problems

A cylindrical gasket for use in an insertion-type exhaust pipe joint in accordance with the present invention comprises: a reinforcing member made from a compressed metal wire net; a heat-resistant material filled in meshes of the metal wire net of the reinforcing member and containing graphite and an inorganic binder which are compressed; and pores which are dispersedly distributed in the reinforcing member and the heat-resistant material, wherein the reinforcing member and the heat-resistant material are intertwined with each other so as to be provided with structural integrity, and with respect to a total volume of the cylindrical gasket, the reinforcing member occupies a volume of 32 to 60%, the heat-resistant material occupies a volume of 5 to 58%, and the pores occupy a volume of 10 to 35%.

According to cylindrical gasket in accordance with the present invention, since the percentage contents of the reinforcing member and the heat-resistant material are 32 to 60% and 5 to 58% in the volume ratio, the tightening force due to the tightening band and the load due to vibrations are borne by the reinforcing member made from the metal wire net, so that permanent set is difficult to occur. In addition, since the heat-resistant material is filled in the meshes of the metal wire net of that reinforcing member and the percentage content of the pores is 10 to 35% in the volume ratio, sealability also excels. Thus, it is possible to provide a cylindrical gasket which is suitably used for an insertion-type exhaust pipe joint and which has both sealability and rigidity.

In addition, according to the cylindrical gasket in accordance with the present invention, as the cylindrical gasket is used by being incorporated in the insertion-type exhaust pipe joint, owing to the thermal action of high-temperature exhaust gases flowing through the exhaust pipe, a hardening binding characteristic is manifested in the inorganic binder in the heat-resistant material by such as condensation due to thermal dehydration and the transition of crystals due to high-temperature heating, with the result that the rigidity of the cylindrical gasket is further enhanced.

In the cylindrical gasket in accordance with the present invention, as the graphite, at least one of natural graphite constituted of crystalline graphite, amorphous graphite, crystalline flake graphite, or vein graphite, artificial graphite, and expanded graphite is suitably selected for use.

In the cylindrical gasket in accordance with the present invention, as the inorganic binder, at least one of the following may be selected for use: aluminum dihydrogen phosphate (monobasic aluminum phosphate) $[Al(H_2PO_4)_3]$, aluminum hydrogen phosphate (dibasic aluminum phosphate) $[Al_2(HPO_4)_3]$, magnesium dihydrogen phosphate (monobasic magnesium phosphate) $[Mg(H_2PO_4)_2]$, magnesium hydrogen phosphate (dibasic magnesium phosphate) $(MgHPO_4)$, calcium dihydrogen phosphate (monobasic calcium phosphate) $[Ca(H_2PO_4)_2]$, calcium hydrogen phosphate (dibasic calcium phosphate) $(CaHPO_4)$, and phosphoric acid $(H_3PO_4)$.

Each of these inorganic binders effects the joining of graphite powder particles and the joining of the heat-resistant material powder to the meshes of the metal wire net of the reinforcing member. As the inorganic binder is compounded with graphite, the inorganic binder causes a hardening binding characteristic to be manifested by such as condensation due to thermal dehydration and the transition of crystals due to high-temperature heating, so that the inorganic binder exhibits the effect of enhancing the rigidity of the cylindrical gasket.

In the cylindrical gasket in accordance with the present invention, a mass ratio between the graphite and the inorganic binder contained in the heat-resistant material is preferably 1:0.1 to 1, more preferably 1:0.15 to 0.75.

In a preferred example, the reinforcing member is contained densely in a radial direction from a cylindrical inner peripheral surface to a cylindrical outer peripheral surface thereof.

If the reinforcing member is thus contained densely, the tightening force due to the tightening band and the load due to vibrations can be satisfactorily borne by the reinforcing member, so that the occurrence of permanent set can be reduced further.

In a method of manufacturing a cylindrical gasket in accordance with the present invention for use in an insertion-type exhaust pipe joint, the cylindrical gasket including a reinforcing member made from the compressed belt-shaped metal wire net, a heat-resistant material filled in the meshes of the belt-shaped metal wire net of the reinforcing member and containing the graphite powder and the inorganic binder which are compressed, and pores which are dispersedly distributed in the reinforcing member and the heat-resistant material, wherein the reinforcing member and the heat-resistant material are intertwined with each other so as to be provided with structural integrity, and with respect to a total volume of the cylindrical gasket, the reinforcing member occupies a volume of 32 to 60%, the heat-resistant material occupies a volume of 5 to 58%, and the pores occupy a volume of 10 to 35%, the method of manufacturing a cylindrical gasket comprises the steps of: (1) compounding a graphite powder, an inorganic binder, and distilled water at a predetermined ratio and compounding them to fabricate a wet heat-resistant material powder containing the graphite powder and the inorganic binder; (2) passing a tubular metal wire net obtained by weaving a fine metal wire between a pair of rollers so as to be compressed in a radial direction to fabricate a belt-shaped metal wire net; (3) supplying the heat-resistant material powder to both surfaces of the belt-shaped metal wire net and rolling the heat-resistant material powder by the rollers to fill meshes of the belt-shaped metal wire net with the heat-resistant material powder, and subsequently drying the heat-resistant material powder filled in the meshes of the belt-shaped metal wire net to remove water in the heat-resistant material powder, to thereby form a composite belt-shaped member in which the heat-resistant material powder is filled and held in the meshes of the belt-shaped metal wire net; (4) convoluting the composite belt-shaped member into a cylindrical shape by at least two turns to fabricate a tubular base member; and (5) inserting the tubular base member into a cylindrical hollow portion of a die and subjecting the tubular base member to compression forming in the die in an axial direction thereof.

According to the method of manufacturing a cylindrical gasket in accordance with the present invention, since the volume contents of the reinforcing member, the heat-resistant material, and the pores with respect to the entire cylindrical gasket are set to be 32 to 60% for the reinforcing member, 5 to 58% for the heat-resistant material, and 10 to 35% for the pores, it is possible to obtain a cylindrical gasket which has both sealability and rigidity.

In the manufacturing method in accordance with the present invention, preferably, the graphite powder may be selected from at least one of expanded graphite powder, natural graphite powder, and artificial graphite powder; the expanded graphite powder may be a powder which is formed by cutting and pulverizing an expanded graphite sheet; the inorganic binder may be selected from at least one of aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid; and, in a preferred example, a mass ratio among the graphite powder, the inorganic binder, and the distilled water is 1:0.1 to 1:0.1 to 1.

An insertion-type exhaust pipe joint in accordance with the present invention comprises: an outer pipe having a pipe end portion, an enlarged-diameter cylindrical portion provided with an enlarged diameter via an annular shoulder portion at the pipe end portion, an open end portion provided at one axial end portion of the enlarged-diameter cylindrical portion, a flange portion provided on an outer peripheral surface of the open end portion in such a manner as to extend radially outwardly, and a plurality of slits provided in the enlarged-diameter cylindrical portion and in the flange portion in such a manner as to extend axially from an annular end face of the open end portion and to be arranged equidistantly in a circumferential direction; an inner pipe having a pipe end portion which is passed through an interior of the enlarged-diameter cylindrical portion of the outer pipe and is fitted at its one axial end portion to the pipe end portion of the outer pipe, and a flange which is provided uprightly on an outer peripheral surface of another axial end portion of the pipe end portion; the aforementioned cylindrical gasket which is fitted in an annular gap between a cylindrical outer surface of the pipe end portion of the inner pipe and a cylindrical inner surface of the enlarged-diameter cylindrical portion of the outer pipe; and a tightening band which is disposed on a cylindrical outer surface of the enlarged-diameter cylindrical portion of the outer pipe so as to press the cylindrical inner surface of the enlarged-diameter cylindrical portion of the outer pipe against the cylindrical outer peripheral surface of the cylindrical gasket by being tightened, through which pressing the tightening band presses the cylindrical inner peripheral surface of the cylindrical gasket against the cylindrical outer surface of the pipe end portion of the inner pipe, the cylindrical gasket in the annular gap being disposed with an annular end face of its one axial end portion abutting against the flange of the inner pipe.

According to the insertion-type exhaust pipe joint in accordance with the present invention, since the cylindrical gasket, which is fitted in the annular gap between the outer surface of the pipe end portion of the inner pipe and the cylindrical inner surface of the enlarged-diameter cylindrical portion of the outer pipe, has both sealability and rigidity since the volume contents of the reinforcing member, the heat-resistant material, and the pores with respect to the entire portion are set to be 32 to 60% for the reinforcing member, 5 to 58% for the heat-resistant material, and 10 to 35% for the pores. As a result, the sealability at the gap between the inner pipe and the outer pipe is improved, and the leakage of exhaust gases from that gap is prevented as practically as possible. In addition, with the cylindrical gasket which is used by being incorporated in this insertion-type exhaust pipe joint, a hardening binding characteristic is manifested in the inorganic binder in the heat-resistant material by such as condensation due to thermal dehydration and the transition of crystals due to high-temperature heating by virtue of the thermal action of high-temperature exhaust gases flowing through the exhaust pipe, so that the rigidity is enhanced. Hence, defects such as permanent set do not occur, and rigidity can be maintained over extended periods of time.

Advantages of the Invention

According to the present invention, since the volume contents of the reinforcing member, the heat-resistant material, and the pores are respectively set to 32 to 60%, 5 to 58%, and 10 to 35%, it is possible to provide a cylindrical gasket having both sealability and rigidity as well as a method of manufacturing the same. In addition, it is possible to provide an insertion-type exhaust pipe joint having a cylindrical gasket which is capable of improving sealability at the gap between the inner pipe and the outer pipe and preventing as practically as possible the leakage of exhaust gases from that gap.

MODE FOR CARRYING OUT THE INVENTION

Figure 1:
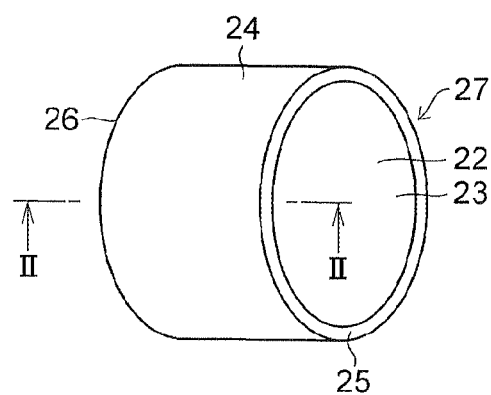
FIG. 1 is an explanatory perspective view of a cylindrical gasket which is manufactured in one embodiment of the present invention.

Next, a more description will be given of the present invention and a mode for carrying it out on the basis of the preferred embodiments illustrated in the drawings. It should be noted that the present invention is not limited to these embodiments.

A description will be given of constituent materials of a cylindrical gasket and a method of manufacturing the cylindrical gasket in accordance with the invention.

<Heat-Resistant Material: Graphite>

Graphite powder used as a heat-resistant material is selected from at least one of a natural graphite powder, which is constituted of at least one of crystalline graphite, amorphous graphite, crystalline flake graphite, and vein graphite, an artificial graphite powder, and an expanded graphite powder.

Here, the expanded graphite powder refers to a graphite powder wherein raw material graphite (natural graphite) powder is immersed in a solution containing an acidic substance and an oxidizing agent to generate a graphite intercalation compound, which is then subjected to heat treatment so as to be expanded in the C-axis direction of the graphite crystal.

A description will be given of one example of a method of producing the expanded graphite powder. While concentrated sulfuric acid of a 98% concentration is being agitated as an acidic substance, a 60% aqueous solution of hydrogen peroxide is added to it as an oxidizing agent, and this solution is used as a reaction solution. This reaction solution is cooled and kept at a temperature of 10° C., natural flake graphite powder having a particle size of 30 to 80 meshes is added to the reaction solution, and reaction is allowed to take place for 30 minutes. After the reaction, acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid sufficiently removed is dried for 3 hours in a drying furnace held at a temperature of 110° C., and this is used as an acid-treated graphite powder.

The above-described acid-treated graphite powder is subjected to heating (expansion) treatment for 1 to 10 seconds at temperatures of 950 to 1200° C. to produce cracked gas. The gaps between graphite layers are expanded by its gas pressure to form expanded graphite powder (expansion rate: 240 to 300 times).

The expanded graphite powder thus produced can be used as the heat-resistant material in the present invention, but since this expanded graphite powder has a very low bulk density of 0.05 g/cm$^2$, it is very difficult to handle. Accordingly, in the present invention, it is preferable to use as the expanded graphite powder a pulverized expanded graphite powder which is obtained by feeding the aforementioned expanded graphite powder to a twin roller apparatus adjusted to a desired roll nip so as to be subjected to roll forming to thereby form an expanded graphite sheet having a desired thickness, and then by cutting and pulverizing this expanded graphite sheet by a pulverizing machine. By using the expanded graphite sheet, it is possible to make effective use of otherwise wasteful scraps, i.e., so-called edge material, which is produced, for instance, at the time of cutting the expanded graphite sheet along a desired shape, thereby making it possible to attain a reduction of the material cost of the expanded graphite powder and, hence, making it possible to attain a cost reduction of the cylindrical gasket itself.

<Heat-Resistant Material: Inorganic Binder>

As an inorganic binder for holding the graphite powder onto a belt-shaped metal wire net serving as a reinforcing member and in its meshes simultaneously with the joining of particles of the graphite powder, at least one of the following is selected for use: aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid.

<Reinforcing Member>

As a reinforcing member, a tubular metal wire net constituted by a knitted metal wire net, a tabular knitted metal wire net, or particularly a cylindrical knitted metal wire net is suitably used which is formed by knitting one or more fine metal wires including, as an iron-based wire, a stainless steel wire made of such as austenitic stainless steels SUS 304, SUS 310 S, and SUS 316, a ferritic stainless steel SUS 430, or an iron wire (JIS-G-3532) or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

Figure 4:
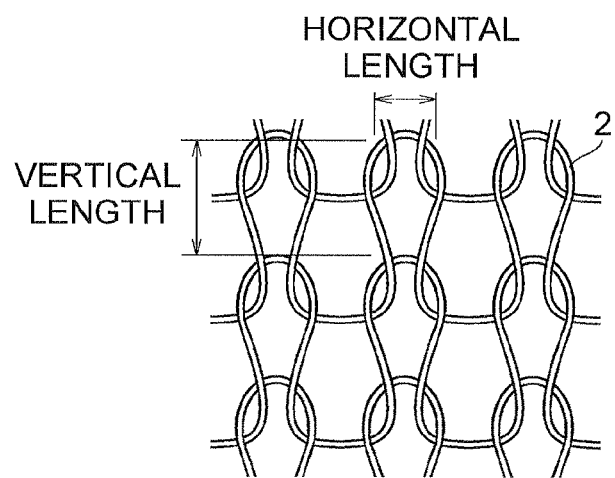
FIG. 4 is an explanatory plan view illustrating meshes of a metal wire net of the reinforcing member.

As the fine metal wire for forming the metal wire net, a fine metal wire whose diameter is 0.05 to 0.50 mm or thereabouts is used. For the metal wire net for the reinforcing member formed by the fine metal wire of that diameter, one whose mesh size (see FIG. 4 illustrating a knitted metal wire net) is 1.5 to 6 mm long and 1.0 to 5 mm wide or thereabouts is suitably used.

Next, referring to the drawings, a description will be given of a method of manufacturing a cylindrical gasket which is constituted of the above-described constituent materials.

(First Process)

As the graphite powder, at least one of an expanded graphite powder, a natural graphite powder, and an artificial graphite powder obtained by pulverizing natural graphite, artificial graphite, expanded graphite, and an expanded graphite sheet is prepared. An inorganic binder and a distilled water, which is selected from at least one of aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid, are then compounded therewith at a ratio of predetermined amounts, and they are kneaded, thereby fabricating a wet heat-resistant material powder 1 consisting of the graphite powder, the inorganic binder, and the distilled water. The mass ratio among the graphite powder, the inorganic binder, and the distilled water which are contained in this wet heat-resistant material powder 1 is preferably 1:0.1 to 1:0.1 to 1.

(Second Process)

Figure 3:
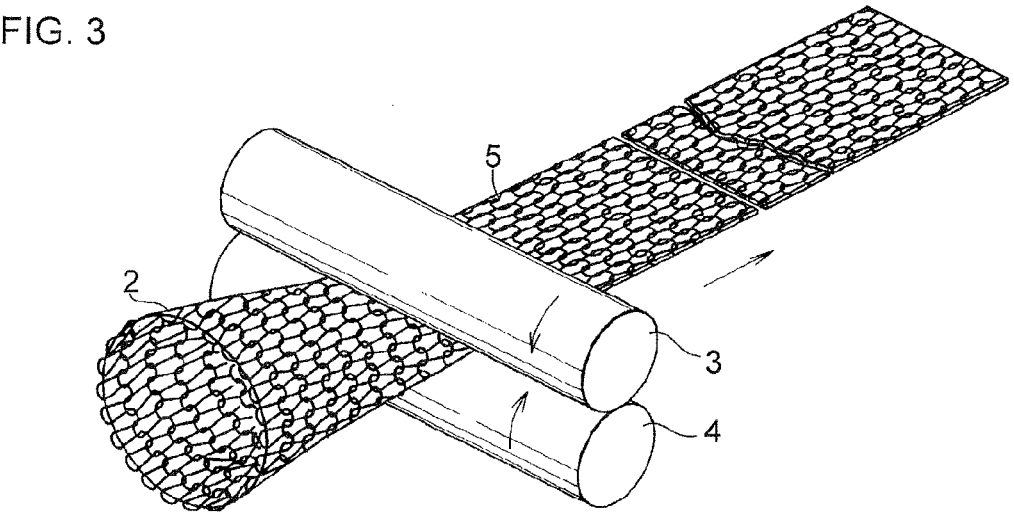
FIG. 3 is an explanatory perspective view of a method of forming a reinforcing member in the process of manufacturing the cylindrical gasket in accordance with the present invention.

As shown in FIG. 3, a tubular metal wire net 2 is prepared which is made from a hollow cylindrical knitted metal wire net obtained by continuously knitting a fine metal wire with a diameter of 0.05 to 0.50 mm by a knitting machine (not shown) and whose mesh size is 0.25 to 6 mm long and 1.5 to 5 mm wide or thereabouts (see FIG. 4). This tubular metal wire net 2 is passed between a pair of rollers 3 and 4 and is compressed in the radial direction, to thereby fabricate a belt-shaped metal wire net 5 having a desired width.

Figure 5:
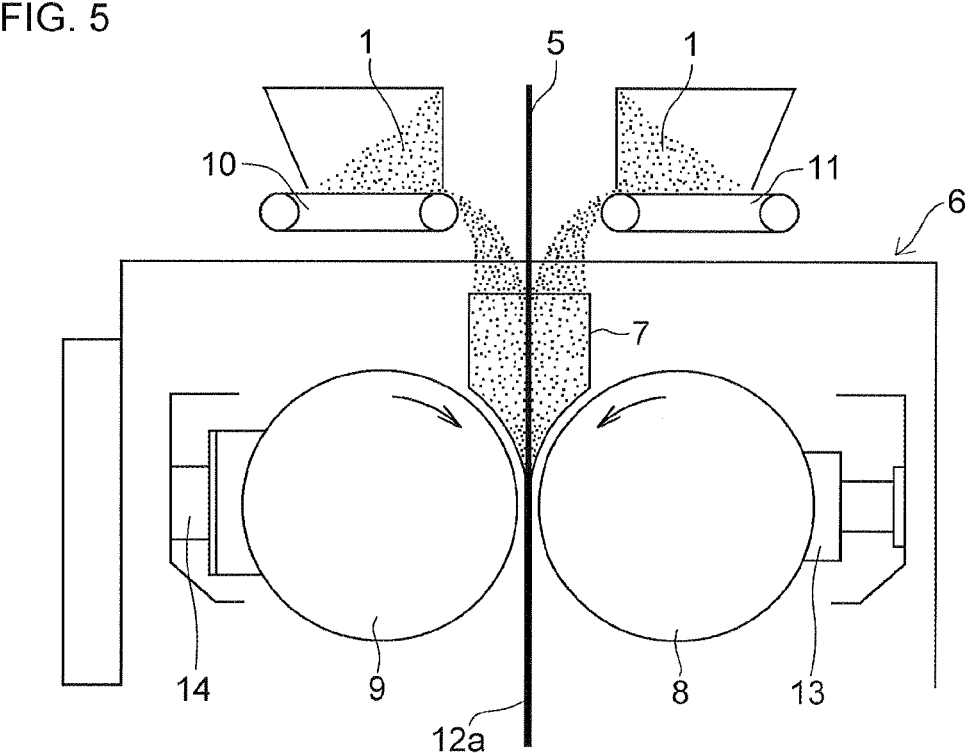
FIG. 5 is an explanatory cross-sectional view of a method of forming a composite belt-shaped member in the process of manufacturing the cylindrical gasket in accordance with the present invention.

As shown in FIG. 5, the belt-shaped metal wire net 5 is inserted into a hopper 7 of a rolling apparatus 6, an inserting end portion of the belt-shaped metal wire net 5 is passed between a pair of rollers 8 and 9, and the wet heat-resistant material powder 1 is fed from conveyors 10 and 11 to the interior of the hopper 7 bisected by the belt-shaped metal wire net 5. The heat-resistant material powder 1 fed into the hopper 7 is supplied to both surfaces of the belt-shaped metal wire net 5 between the rollers 8 and 9, and the heat-resistant material powder 1 is rolled between the rollers 8 and 9 to fill the meshes of the belt-shaped metal wire net 5 with the heat-resistant material powder 1, thereby fabricating a composite belt-shaped base material 12a in which the belt-shaped metal wire net 5 and the heat-resistant material powder 1 held on the belt-shaped metal wire net 5 and in its meshes are integrated. The composite belt-shaped base material 12a is cut into a desired length and is taken up in roll form. It should be noted that, in FIG. 5, reference numeral 13 denotes a load cell disposed on the one roller 8 side, and 14 denotes a fluid cylinder disposed on the other roller 9 side.

(Third Process)

Figure 6:
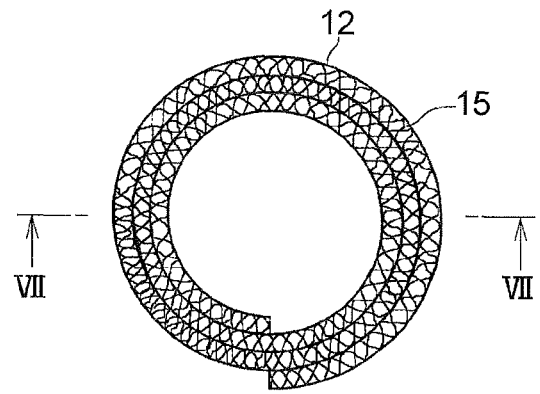
FIG. 6 is an explanatory plan view of a tubular base member in the process of manufacturing the cylindrical gasket in accordance with the present invention.
Figure 7:
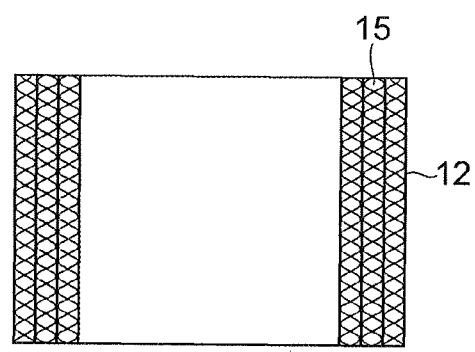
FIG. 7 is an explanatory cross-sectional view, taken in the direction of arrows along line VII-VII, of the tubular base member shown in FIG. 6.

After the fabrication of the composite belt-shaped base material 12a cut into a desired length and taken up in roll form, the composite belt-shaped base material 12a is dried in a drying furnace to remove the water content from the heat-resistant material powder 1 in the composite belt-shaped base material 12a through evaporation and dissipation, and the composite belt-shaped base material 12a is subsequently cut into a desired length, thereby fabricating a composite belt-shaped member 12 in which the heat-resistant material powder 1 is filled and held in the meshes of the belt-shaped metal wire net 5. A tubular base member 15 is fabricated by convoluting this composite belt-shaped member 12 around a core (not shown) by at least two turns, or by 3 turns in Examples, as shown in FIGS. 6 and 7.

Figure 8:
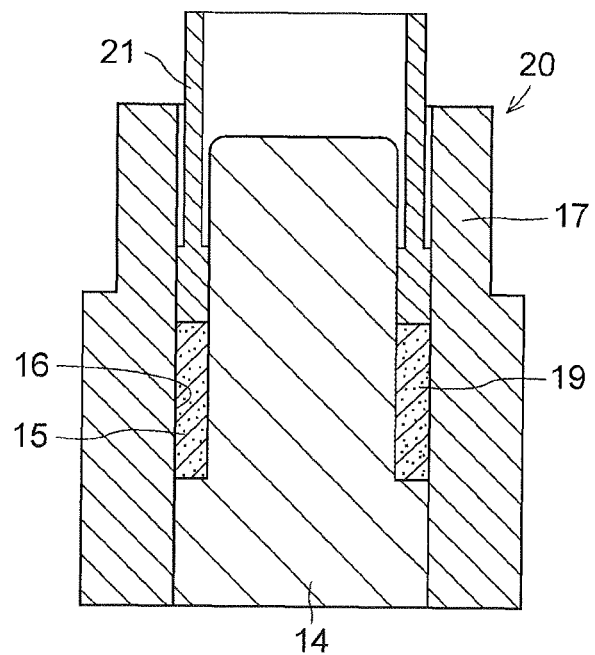
FIG. 8 is an explanatory cross-sectional view illustrating a state in which the tubular base member is inserted in a die in the process of manufacturing the cylindrical gasket in accordance with the present invention.

A die 20 such as the one shown in FIG. 8 is prepared in the interior of which a hollow cylindrical portion 19 is formed as a stepped core 18 is fittingly inserted in a through hole 16 of a cavity 17 having the through hole 16 in its interior. The tubular base member 15 is then fitted over the stepped core 18 of the die 20.

Figure 2:
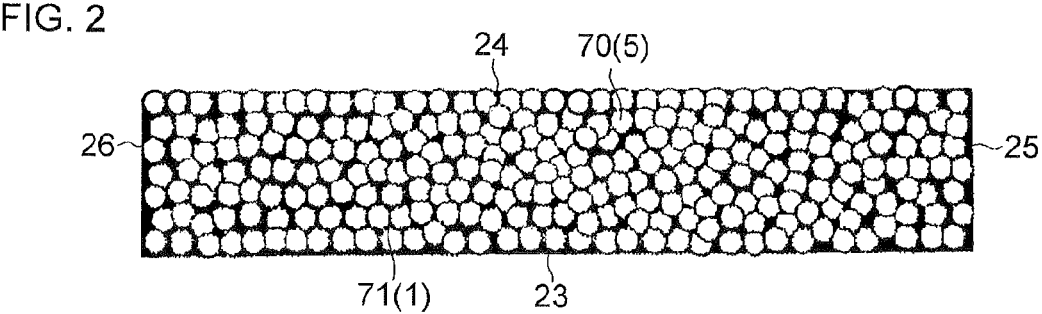
FIG. 2 is an explanatory schematic cross-sectional view taken in the direction of arrows along line II-II of FIG. 1.

The tubular base member 15 inserted in the hollow cylindrical portion 19 of the die 20 is subjected to compression forming by a punch 21 under a pressure of 98 to 294 N/mm$^2$ (1 to 3 tons/cm$^2$) in the direction of the core axis. Thus, a cylindrical gasket 27 is fabricated which includes a cylindrical inner peripheral surface 23 defining a through hole 22, a cylindrical outer peripheral surface 24, and annular end faces 25 and 26, as shown in FIGS. 1 and 2.

The cylindrical gasket 27 fabricated by the compression forming of the tubular base member 15 includes a reinforcing member 70 made from the compressed belt-shaped metal wire net 5 and compressed; a heat-resistant material 71 filled in the meshes of the belt-shaped metal wire net 5 of the reinforcing member 70 and containing the graphite and the inorganic binder which are compressed; and pores which are dispersedly distributed in the reinforcing member 70 and the heat-resistant material 71, and the reinforcing member 70 and the heat-resistant material 71 are intertwined with each other so as to be provided with structural integrity. The inner peripheral surface 23, the outer peripheral surface 24, and the end faces 25 and 26 of the cylindrical gasket 27 are each formed by a smooth surface in which the reinforcing member 70 and the heat-resistant material 71 are present in mixed form, the reinforcing member 70 is contained densely in the radial direction from the inner peripheral surface 23 to the outer peripheral surface 24, and the volume contents of the reinforcing member 70, the heat-resistant material 71, and the pores in the cylindrical gasket 27 are 32 to 60%, 5 to 58%, and 10 to 35%, respectively.

The relative amount of the content of the pores contained in the cylindrical gasket 27 is related to the relative quality of the sealability of the cylindrical gasket 27. If the content of the pores is less than 10% in the volume ratio, the rigidity of the cylindrical gasket 27 itself can be increased, but a difficulty in the insertability of the cylindrical gasket 27 with respect to the inner peripheral surface of the exhaust pipe is entailed, and its initial conformability with the inner peripheral surface of the exhaust pipe is poor, with the result that there is a possibility of causing a decline in sealability. On the other hand, if the content of the pores exceeds 35% in the volume ratio, a large number of continuous pores appear in the interior of the cylindrical gasket 27, possibly causing a decline in the sealability and a decline in the rigidity of the cylindrical gasket 27. Accordingly, the content of the pores contained in the cylindrical gasket 27 is preferably 10 to 35%, more preferably 15 to 30%, in the volume ratio.

Figure 9:
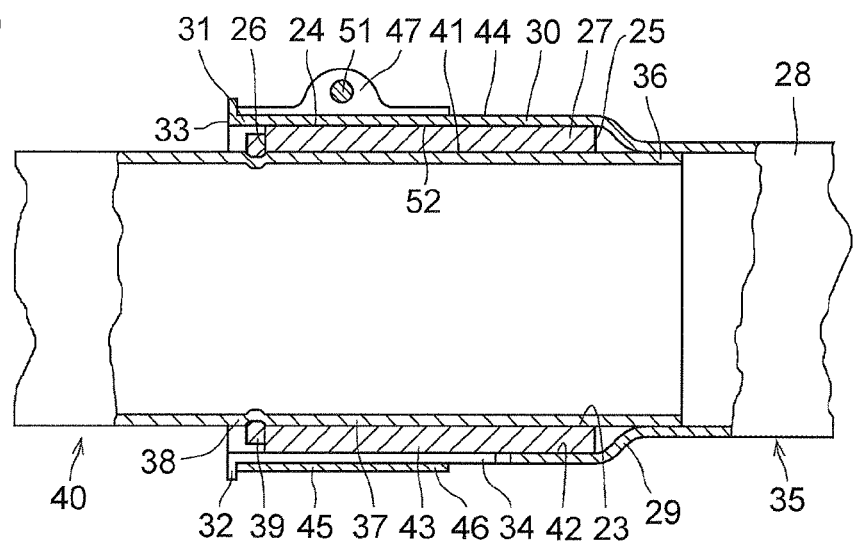
FIG. 9 is an explanatory longitudinal cross-sectional view of an insertion-type exhaust pipe joint incorporating one example of the cylindrical gasket in accordance with the present invention.
Figure 10:
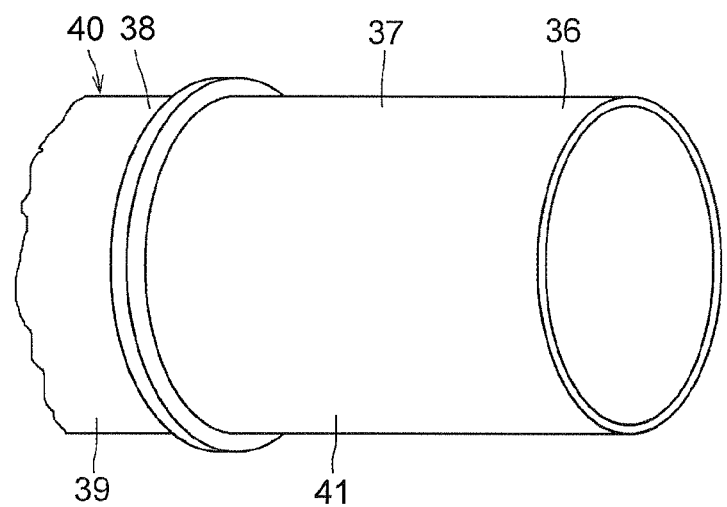
FIG. 10 is an explanatory perspective view of an inner pipe of the insertion-type exhaust pipe joint.
Figure 11:
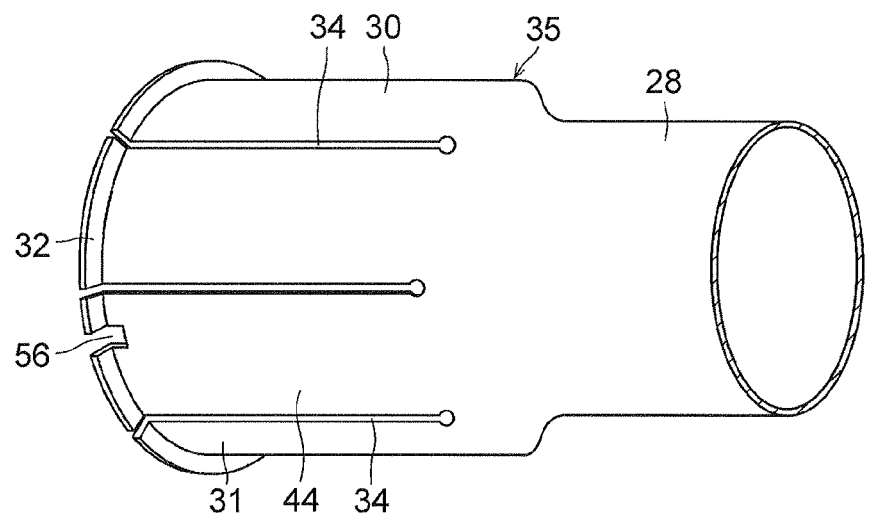
FIG. 11 is an explanatory perspective view of an outer pipe of the insertion-type exhaust pipe joint.
Figure 12:
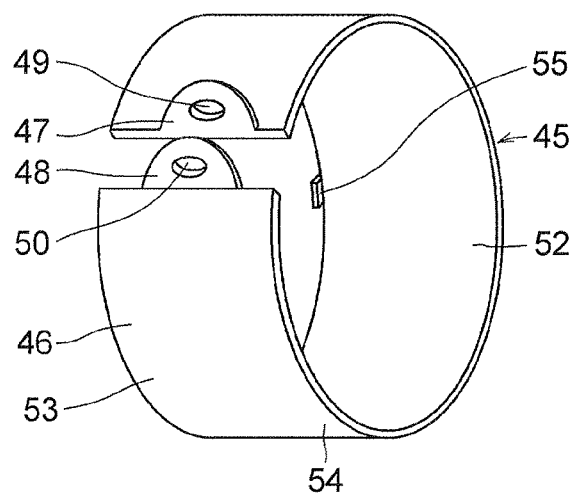
FIG. 12 is an explanatory perspective view of a tightening band of the insertion-type exhaust pipe joint.

The cylindrical gasket 27 is used by being incorporated in an insertion-type exhaust pipe joint shown in FIG. 9. The insertion-type exhaust pipe joint shown in FIG. 9 includes an outer pipe 35 (see FIGS. 9 and 11) having a pipe end portion 28, an enlarged-diameter cylindrical portion 30 formed with an enlarged diameter at the pipe end portion 28 via a tapered annular shoulder portion 29, an open end portion 31 formed at one axial end portion of the enlarged-diameter cylindrical portion 30, a flange portion 32 formed on an outer peripheral surface of the open end portion 31 in such a manner as to extend radially outwardly, and a plurality of slits 34 provided in the enlarged-diameter cylindrical portion 30 and in the flange portion 32 in such a manner as to extend axially from an open end face 33 of the open end portion 31 and to be arranged equidistantly in the circumferential direction; an inner pipe 40 (see FIGS. 9 and 10) having a pipe end portion 37 which is passed through the interior of the enlarged-diameter cylindrical portion 30 of the outer pipe 35 and is fitted at its one axial end portion 36 to the pipe end portion 28 of the outer pipe 35, and a flange 39 which is provided uprightly on a cylindrical outer surface of another axial end portion 38 of the pipe end portion 37; the cylindrical gasket 27 which is fitted in an annular gap 43 between a cylindrical outer surface 41 of the pipe end portion 37 of the inner pipe 40 and a cylindrical inner surface 42 of the enlarged-diameter cylindrical portion 30 of the outer pipe 35; and a tightening band 45 (see FIGS. 9 and 12) which is disposed on a cylindrical outer surface 44 of the enlarged-diameter cylindrical portion 30. The tightening band 45, which has a cylindrical main body 46 and a pair of lugs 47 and 48 provided in such a manner as to integrally project radially outwardly from the cylindrical main body 46, is so adapted that as its cylindrical main body 46 is made to undergo a reduction in diameter by the tightening of a tightening tool 51 such as a bolt which is inserted into through holes 49 and 50 of the pair of lugs 47 and 48, the tightening band 45 presses the cylindrical inner surface 42 of the enlarged-diameter cylindrical portion 30 of the outer pipe 35 against the cylindrical outer peripheral surface 24 of the cylindrical gasket 27 by means of an inner peripheral surface 52 of the cylindrical main body 46, and through this pressing the tightening band 45 presses the cylindrical inner peripheral surface 23 of the cylindrical gasket 27 against the cylindrical outer surface 41 of the pipe end portion 37 of the inner pipe 40. The cylindrical gasket 27 in the annular gap 43 is disposed with the end face 26 of its one axial end portion abutting against the flange 39 of the inner pipe 40, and thus the cylindrical gasket 27 is adapted to hermetically seal the annular gap 43 between the inner pipe 40 and the outer pipe 35 to thereby prevent the leakage of exhaust gases from the annular gap 43.

In the above-described insertion-type exhaust pipe joint, a hook portion 55 projecting radially inwardly is provided at one end portion 53 of the axial end portions 53 and 54 of the tightening band 45. The hook portion 55 has a cross section similar to that of a notched portion 56 formed in the flange portion 32 of the enlarged-diameter cylindrical portion 30 of the outer pipe 35, and when the tightening band 45 is fitted on the cylindrical outer surface 44 of the enlarged-diameter cylindrical portion 30 of the outer pipe 35, the hook portion 55 freely passes through the notched portion 56 formed in the flange portion 32, and is brought into contact at its inner surface with an axial side surface of the flange 39 of the inner pipe 40 and engages the flange 39, so that the outer pipe 35 at its flange portion 32 axially engages the tightening band 45. As a result, even if a force which tends to separate the inner pipe 40 and the outer pipe 35 in the axial direction, the inner pipe 40 and the outer pipe 35 are prevented from becoming disengaged from each other.

In the cylindrical gasket 27 which is used by being incorporated in the insertion-type exhaust pipe joint, owing to the thermal action of high-temperature exhaust gases flowing through the inner pipe 40 of the exhaust pipe, a hardening binding characteristic is manifested in the inorganic binder in the heat-resistant material by such as condensation due to thermal dehydration and the transition of crystals due to high-temperature heating, and the rigidity of the heat-resistant material is hence enhanced, so that the cylindrical gasket 27 does not undergo defects such as permanent set, thereby making it possible to maintain the rigidity of the cylindrical gasket 27 over extended periods of time.

It should be noted that, in the present invention, with the cylindrical gasket 27 whose rigidity has been enhanced, since such defects as the permanent set are not produced even by a large tightening force exerted by the tightening band 45, the hook portion 55 and the notched portion 56 may not necessarily be provided on the tightening band 45 and in the flange portion 32.

EXAMPLES

Next, the present invention will be described in detail in accordance with examples. It should be noted that the present invention is not limited to these examples.

Example 1

As the graphite powder, an expanded graphite powder was used which was fabricated by cutting and pulverizing an expanded graphite sheet having a density of 1.2 Mg/m$^3$ and a thickness of 0.4 mm.

As the inorganic binder, aluminum dihydrogen phosphate (monobasic aluminum phosphate) [Al(H$_2$PO$_4$)$_3$] was used.

The expanded graphite powder, the aluminum dihydrogen phosphate, and the distilled water were compounded at a mass ratio of 1:0.25:0.75 and were kneaded to thereby fabricate a wet heat-resistant material powder.

By using seven austenitic stainless steel wires (SUS 304) having a wire diameter of 0.15 mm as fine metal wires, a cylindrical knitted metal wire net whose mesh size was 2.0 mm long and 1.5 mm wide or thereabouts was fabricated and was passed between a pair of rollers to form a belt-shaped metal wire net for the reinforcing member.

The belt-shaped metal wire net was inserted into the hopper of the rolling apparatus shown in FIG. 5, an inserting end portion of the belt-shaped metal wire net was passed between a pair of rolling rollers, and the wet heat-resistant material powder was fed from conveyors to the interior of the hopper bisected by the belt-shaped metal wire net. The heat-resistant material powder fed into the hopper was supplied to both surfaces of the belt-shaped metal wire net and was concurrently supplied between the rolling rollers to roll the heat-resistant material powder between the rolling rollers, thereby fabricating a composite belt-shaped base material in which the belt-shaped metal wire net and the heat-resistant material powder filled and held in the meshes of the belt-shaped metal wire net were integrated.

The composite belt-shaped base material thus fabricated was dried in a drying furnace to evaporate and dissipate water contained in the heat-resistant material powder, and the composite belt-shaped base material after being dried was cut, thereby fabricating a composite belt-shaped member (the mass of the composite belt-shaped member: 32.7 g, the mass of the belt-shaped metal wire net in the composite belt-shaped member: 27.2 g, the mass of aluminum dihydrogen phosphate: 1.1 g, and the mass of the expanded graphite powder: 4.4 g) having a width of 63 mm and a length of 175 mm or thereabouts.

A tubular base member was fabricated by convoluting the composite belt-shaped member around the outer peripheral surface of a cylindrical core by two turns.

The tubular base member was then fitted over the stepped core of the die shown in FIG. 8, in the interior of which the hollow cylindrical portion was formed as the stepped core was fittingly inserted in the through hole of the cavity having the through hole in its interior.

The tubular base member disposed in the hollow cylindrical portion of the die was subjected to compression forming under a pressure of 196 N/mm$^2$ (2 tons/cm$^2$) in the direction of the core axis. Thus, a cylindrical gasket was fabricated which included the cylindrical inner peripheral surface defining the through hole, the cylindrical outer peripheral surface, and the annular end faces, and which had an inside diameter of 22.1 mm, an outside diameter of 29.4 mm, and a length of 25.0 mm. In this cylindrical gasket, the percentage contents of the reinforcing member, the heat-resistant material, and the pores were 46.5%, 37.0%, and 16.5%, respectively, in the volume ratio.

Example 2

As the graphite powder, an expanded graphite powder similar to that of Example 1 described above was used, as the inorganic binder, calcium dihydrogen phosphate (monobasic calcium phosphate) [Ca(H$_2$PO$_4$)$_2$] was used, and the expanded graphite powder, the calcium dihydrogen phosphate, and the distilled water were compounded at a mass ratio of 1:0.25:0.75 and were kneaded to thereby fabricate a wet heat-resistant material powder.

As the belt-shaped metal wire net, a belt-shaped metal wire net similar to that of Example 1 described above was used.

By using this wet heat-resistant material powder and the belt-shaped metal wire net, a composite belt-shaped base material was fabricated in the same way as in Example 1 described above.

The composite belt-shaped base material was dried in the drying furnace to evaporate and dissipate water contained in that heat-resistant material powder, and the composite belt-shaped base material was subsequently cut, thereby fabricating a composite belt-shaped member (the mass of the composite belt-shaped member: 32.7 g, the mass of the belt-shaped metal wire net in the composite belt-shaped member: 27.2 g, the mass of calcium dihydrogen phosphate: 1.1 g, and the mass of the expanded graphite: 4.4 g) having a width of 63 mm and a length of 175 mm or thereabouts.

A tubular base member was fabricated by convoluting the composite belt-shaped member around the outer peripheral surface of the cylindrical core by two turns. In the same way as in Example 1 described above, a cylindrical gasket was fabricated which included the cylindrical inner peripheral surface defining the through hole, the cylindrical outer peripheral surface, and the annular end faces, and which had an inside diameter of 22.1 mm, an outside diameter of 29.4 mm, and a length of 25.0 mm. In this cylindrical gasket, the percentage contents of the reinforcing member, the heat-resistant material, and the pores were 46.5%, 33.9%, and 19.6%, respectively, in the volume ratio.

Example 3

As the graphite powder, an expanded graphite powder similar to that of Example 1 described above was used, as the inorganic binder, magnesium hydrogen phosphate (dibasic magnesium phosphate) ($MgHPO_4$) was used, and the expanded graphite powder, the magnesium hydrogen phosphate, and the distilled water were compounded at a mass ratio of 1:0.5:0.5 and were kneaded to thereby fabricate a wet heat-resistant material powder.

As the belt-shaped metal wire net for the reinforcing member, a belt-shaped metal wire net similar to that of Example 1 described above was used.

A composite belt-shaped base material was fabricated from this wet heat-resistant material powder and the belt-shaped metal wire net in the same way as in Example 1 described above.

The composite belt-shaped base material thus fabricated was dried in the drying furnace to evaporate and dissipate water contained in that heat-resistant material powder, and the composite belt-shaped base material was subsequently cut, thereby fabricating a composite belt-shaped member (the mass of the composite belt-shaped member: 32.7 g, the mass of the belt-shaped metal wire net in the composite belt-shaped member: 27.2 g, the mass of magnesium hydrogen phosphate: 1.8 g, and the mass of the expanded graphite powder: 3.7 g) having a width of 63 mm and a length of 175 mm or thereabouts.

A tubular base member was fabricated by convoluting the composite belt-shaped member around the outer peripheral surface of the cylindrical core by two turns. In the same way as in Example 1 described above, a cylindrical gasket was fabricated which included the cylindrical inner peripheral surface defining the through hole, the cylindrical outer peripheral surface, and the annular end faces, and which had an inside diameter of 22.1 mm, an outside diameter of 29.4 mm, and a length of 25.0 mm. In this cylindrical gasket, the percentage contents of the reinforcing member, the heat-resistant material, and the pores were 46.5%, 34.4%, and 19.1%, respectively, in the volume ratio.

Example 4

As the graphite powder, flaky natural graphite powder was used, as the inorganic binder, phosphoric acid ($H_3PO_4$: 75% aqueous solution) was used, and the natural graphite powder and the phosphoric acid were compounded at a mass ratio of 1:0.2 and were kneaded to thereby fabricate a wet heat-resistant material powder.

By using two austenitic stainless steel wires (SUS 304) having a wire diameter of 0.28 mm as fine metal wires, a cylindrical knitted metal wire net whose mesh size was 3.0 mm long and 2.0 mm wide or thereabouts was fabricated and was passed between a pair of rollers to form a belt-shaped metal wire net for the reinforcing member.

By using the aforementioned wet heat-resistant material powder and the belt-shaped metal wire net, a composite belt-shaped base material was fabricated in the same way as in Example 1 described above.

The composite belt-shaped base material was dried in the drying furnace to evaporate and dissipate water contained in the heat-resistant material powder, and the composite belt-shaped base material after being dried was cut, thereby fabricating a composite belt-shaped member (the mass of the composite belt-shaped member: 31.8 g, the mass of the belt-shaped metal wire net in the composite belt-shaped member: 27.1 g, the mass of phosphoric acid: 0.6 g, and the mass of the expanded graphite: 4 g) having a width of 63 mm and a length of 175 mm or thereabouts.

A tubular base member was fabricated by convoluting the composite belt-shaped member around the outer peripheral surface of the cylindrical core by two turns. In a method similar to that of Example 1 described above, a cylindrical gasket was fabricated which included the cylindrical inner peripheral surface defining the through hole, the cylindrical outer peripheral surface, and the annular end faces, and which had an inside diameter of 22.1 mm, an outside diameter of 29.4 mm, and a length of 25.0 mm. In this cylindrical gasket, the percentage contents of the reinforcing member, the heat-resistant material, and the pores were 46.5%, 29.2%, and 24.3%, respectively, in the volume ratio.

Comparative Example

An expanded graphite sheet for the heat-resistant material was prepared which had a density of 1.2 $Mg/m^3$ and a thickness of 0.4 mm and was cut into a size of 75 mm in width and 257 mm in length.

By using one austenitic stainless steel wire (SUS 304) having a wire diameter of 0.15 mm as a fine metal wire, a cylindrical knitted metal wire net whose mesh size was 4.0 mm long and 3.0 mm wide or thereabouts was fabricated and was passed between a pair of rollers to form a belt-shaped metal wire net, cut the metal wire net into a size of 68 mm in width and 257 mm in length, and this metal wire net was used as the belt-shaped metal wire net for the reinforcing member.

A superposed assembly was fabricated in which an expanded graphite sheet and a belt-shaped metal wire net were superposed on each other such that the expanded graphite sheet projected in the widthwise direction from both widthwise ends of the belt-shaped metal wire net, which serve as annular end faces of the cylindrical gasket, and such that one lengthwise end of the belt-shaped metal wire net and a lengthwise end of the expanded graphite sheet corresponding to that one end were aligned.

The superposed assembly was convoluted around the outer peripheral surface of the cylindrical core with the expanded graphite sheet placed on the inner side such that the expanded graphite sheet was convoluted with one more turn, thereby forming a tubular base member in which the expanded graphite sheet was exposed on both the inner peripheral side and the outer peripheral side. In this tubular base member, both widthwise end portions of the expanded graphite sheet respectively projected from the belt-shaped metal wire net in the widthwise direction thereof.

The tubular base member was then fitted over the stepped core of the die shown in FIG. 8, in the interior of which the hollow cylindrical portion was formed as the stepped core was fittingly inserted in the through hole of the cavity having the through hole in its interior.

The tubular base member disposed in the hollow cylindrical portion of the die was subjected to compression forming under a pressure of 196 $N/mm^2$ (2 $tons/cm^2$) in the direction of the core axis. Thus, a cylindrical gasket was fabricated which included the cylindrical inner peripheral surface defining the through hole, the cylindrical outer peripheral surface, and the annular end faces, and which had an inside diameter of 22.1 mm, an outside diameter of 29.4 mm, and a length of 25.0 mm. In this cylindrical gasket, the percentage contents of the reinforcing member formed by the compressed belt-shaped metal wire net, the heat-resistant material formed by the similarly compressed expanded graphite sheet, and the pores were 9.8%, 49.6%, and 40.6%, respectively, in the volume ratio.

Next, a test was conducted on the amount of gas leakage (l/min) and a rate of decline (%) of the tightening torque by the tightening band by incorporating each of the cylindrical gaskets obtained in Examples 1 to 4 and Comparative Example described above into the insertion-type exhaust pipe spherical joint shown in FIG. 9.

<Test Conditions of Gas Leakage Amount and Test Method>
<Test Conditions>
  Tightening force by the tightening band: 12 N·m
  Excitation angle: ±0.5° (with the inner pipe fixed)
  Excitation frequency (oscillation velocity): 50 Hz
  Temperature (outer surface temperature of the inner pipe shown in FIG. 9): from room temperature (25° C.) to 500° C.
  Test time: 24 hrs.
<Test Method>
  The temperature was raised up to 500° C. in 1 hour while continuing the oscillating motion at ±0.5° at an excitation frequency of 50 Hz at room temperature (25° C.). The oscillating motion was continued at that temperature held for 22 hours, and after the lapse of 22 hours the temperature was lowered to room temperature in 1 hour. Measurement was made of the amount of gas leakage at room temperature (before the test start) and the amount of gas leakage after the lapse of the test time of 24 hours.
<Measurement Method of Gas Leakage Amount>
  An opening portion of the outer pipe of the insertion-type exhaust pipe joint shown in FIG. 9 was closed, and dry air was allowed to flow in from the inner pipe side under a pressure of 30 kPa. The amount of gas leakage from the joint portion (gap between the inner pipe and the outer pipe) was measured by a flowmeter two times, i.e., (1) at an early period of the test (before the test start) and (2) after the lapse of 24 hours of the test.

Table 1 shows the results of the above-described test.

TABLE 1

|  |  | Examples |  |  |  | Comparative |
|---|---|---|---|---|---|---|
|  |  | 1 | 2 | 3 | 4 | Example |
| Porosity (%) |  | 16.5 | 19.6 | 19.1 | 24.3 | 40.6 |
| Amount of gas | (1) | 0.06 | 0.08 | 0.08 | 0.07 | 0.09 |
| leakage | (2) | 0.42 | 0.51 | 0.50 | 0.64 | 9.26 |
| Rate of decline of tightening torque (%) |  | 7.6 | 8.3 | 8.6 | 8.1 | 46 |

From the test results shown in Table 1, it can be appreciated that the cylindrical gaskets in accordance with Examples 1 to 4 are superior to the cylindrical gasket in accordance with Comparative Example in terms of the amount of gas leakage and the rate of decline of the tightening torque. It was confirmed that an increase in the amount of gas leakage of the cylindrical gasket in accordance with Comparative Example was ascribable to a substantial decline in the tightening force of the tightening band due to such as the permanent set and stress relaxation of the cylindrical gaskets. In addition, it is conjectured that the low rates of decline in the tightening force of the cylindrical gaskets in accordance with Examples 1 to 4 was ascribable to the fact that the rigidity of the cylindrical gaskets was enhanced as a hardening binding characteristic was manifested in the inorganic binder in the heat-resistant material forming the cylindrical gaskets owing to such as condensation due to thermal dehydration and the transition of crystals due to high-temperature heating.

As described above, with the cylindrical gasket in accordance with the present invention, the reinforcing member and the heat-resistant material has structural integrity by being intertwined with each other, and the contents of the reinforcing member, the heat-resistant material, and the pores are 32 to 60%, 5 to 58%, and 10 to 35%, respectively, in the volume ratio; therefore, the cylindrical gasket in accordance with the present invention has rigidity against the tightening force due to the tightening band and the load due to vibrations, and since the meshes of the metal wire net of the reinforcing member are filled with the heat-resistant material, the cylindrical gasket in accordance with the present invention also excels in sealability. Thus, this cylindrical gasket, when incorporated in the insertion-type exhaust pipe joint and tightened firmly by the tightening band, does not produce such defects as the permanent set, and even when, due to traveling on a rough road, the joint portion is repeatedly subjected to vibrational load and bending torque, and prying repeatedly occurs between the inner and outer pipes, the cylindrical gasket is able to prevent gas leakage from the joint portion of the exhaust pipe as practically as possible.

DESCRIPTION OF REFERENCE NUMERALS

1: heat-resistant material powder
2: cylindrical metal wire net
5: belt-shaped metal wire net
15: tubular base member
17: cavity
18: stepped core
19: hollow cylindrical portion
20: die
21: punch
27: cylindrical gasket
70: reinforcing member
71: heat-resistant material

The invention claimed is:

1. A method of manufacturing a cylindrical gasket for use in an insertion-type exhaust pipe joint, comprising the steps of:
  (1) compounding a graphite powder, an inorganic binder, and distilled water at a predetermined ratio and compounding them to fabricate a wet heat-resistant material containing the graphite powder and the inorganic binder;
  (2) passing a tubular metal wire net obtained by weaving a fine metal wire between a pair of rollers so as to be compressed in a radial direction to fabricate a belt-shaped metal wire net;
  (3) supplying the heat-resistant material to both surfaces of the belt-shaped metal wire net and rolling the heat-resistant material by the rollers to fill meshes of the belt-shaped metal wire net with the heat-resistant material, and subsequently drying the heat-resistant material filled in the meshes of the belt-shaped metal wire net to remove water in the heat-resistant material, to thereby form a composite belt-shaped member in which the heat-resistant material is filled and held in the meshes of the belt-shaped metal wire net;
  (4) convoluting the composite belt-shaped member into a cylindrical shape by at least two turns to fabricate a tubular base member; and
  (5) inserting the tubular base member into a cylindrical hollow portion of a die and subjecting the tubular base member to compression forming in the die in an axial direction thereof,
  wherein the cylindrical gasket includes: a reinforcing member made from the compressed belt-shaped metal wire net; the heat-resistant material filled in the meshes of the belt-shaped metal wire net of said reinforcing member and containing the graphite powder and the inorganic binder which are compressed; and pores which are dispersedly distributed in the reinforcing member and the heat-resistant material, and wherein said reinforcing member and said heat-resistant material are intertwined with each other so as to be provided with structural integrity, and with respect to a total volume of the cylindrical gasket, said reinforcing member occupies a volume of 32 to 60%, the heat-resistant material occupies a volume of 5 to 58%, and the pores occupy a volume of 10 to 35%.

2. The method of manufacturing a cylindrical gasket according to claim 1, wherein the graphite powder is selected from at least one of expanded graphite powder, natural graphite powder, and artificial graphite powder.

3. The method of manufacturing a cylindrical gasket according to claim 2, wherein the expanded graphite powder is a powder which is formed by cutting and pulverizing an expanded graphite sheet.

4. The method of manufacturing a cylindrical gasket according to claim 1, wherein the inorganic binder is selected from at least one of aluminum dihydrogen phosphate, aluminum hydrogen phosphate, magnesium dihydrogen phosphate, magnesium hydrogen phosphate, calcium dihydrogen phosphate, calcium hydrogen phosphate, and phosphoric acid.

5. The method of manufacturing a cylindrical gasket according to claim 1, wherein a mass ratio among the graphite powder, the inorganic binder, and the distilled water is 1:(0.1 to 1):(0.1 to 1).

\* \* \* \* \*